US006933325B2

(12) United States Patent
Zheng et al.

(10) Patent No.: US 6,933,325 B2
(45) Date of Patent: Aug. 23, 2005

(54) HIGH INDEX CURABLE PHOTOCHROMIC COMPOSITION AND ITS PROCESS

(75) Inventors: Qiang Zheng, Palo Alto, CA (US); Donald Scott Nelson, San Ramon, CA (US); Charles William Carper, Jr., Westerville, OH (US); Manfred Melzig, Wessling (DE); Herbert Schuster, Emmering (DE); Herbert Zinner, Rohrbach (DE)

(73) Assignee: Rodenstock GmbH, Munich (DE)

( * ) Notice: Subject to any disclaimer, the term of this patent is extended or adjusted under 35 U.S.C. 154(b) by 27 days.

(21) Appl. No.: 10/269,091

(22) Filed: Oct. 11, 2002

(65) Prior Publication Data

US 2003/0158284 A1 Aug. 21, 2003

Related U.S. Application Data

(60) Provisional application No. 60/329,086, filed on Oct. 12, 2001, and provisional application No. 60/328,810, filed on Oct. 15, 2001.

(51) Int. Cl.⁷ .............................. C08F 2/46; C08F 2/50
(52) U.S. Cl. .................. 522/100; 522/101; 522/13; 522/18; 522/102; 522/103; 522/153; 522/150; 522/167; 522/75; 522/181; 252/582; 252/586; 252/588; 252/589; 264/1.1; 264/1.27; 264/1.32; 264/1.36; 264/494; 264/496; 359/241; 359/242; 359/244; 351/159; 351/160 R; 351/162; 523/106; 523/108
(58) Field of Search ..................... 522/100, 13, 18, 522/38, 101, 102, 103, 153, 150, 167, 75, 181; 252/582, 586, 588, 589; 264/1.1, 1.27, 1.32, 1.36, 1.38, 494, 496; 359/241, 242, 244; 351/159, 160 R, 162; 523/106, 108

(56) References Cited

U.S. PATENT DOCUMENTS

| | | | |
|---|---|---|---|
| 5,399,687 A | 3/1995 | Melzig | |
| 5,498,686 A | 3/1996 | Effer et al. | |
| 5,621,017 A | 4/1997 | Kobayakawa et al. | |
| 5,623,005 A | 4/1997 | Rickwood et al. | |
| 5,645,768 A | 7/1997 | Melzig et al. | |
| 5,707,557 A | 1/1998 | Melzig et al. | |
| 5,763,511 A | 6/1998 | Chan et al. | |
| 5,801,243 A | 9/1998 | Melzig et al. | |
| 5,811,503 A * | 9/1998 | Herold et al. | 526/323.2 |
| 5,910,516 A | 6/1999 | Imura et al. | |
| 5,932,725 A | 8/1999 | Kawabata et al. | |
| 5,952,515 A | 9/1999 | Melzig et al. | |
| 5,973,039 A | 10/1999 | Florent et al. | |
| 5,990,305 A | 11/1999 | Zinner et al. | |
| 6,022,496 A | 2/2000 | Kawabata et al. | |
| 6,034,193 A | 3/2000 | Henry et al. | |
| 6,036,890 A | 3/2000 | Melzig et al. | |
| 6,102,543 A | 8/2000 | Melzig | |
| 6,146,554 A | 11/2000 | Melzig et al. | |
| 6,171,525 B1 | 1/2001 | Effer et al. | |
| 6,190,580 B1 | 2/2001 | Melzig et al. | |
| 6,225,466 B1 | 5/2001 | Mann et al. | |
| 6,248,285 B1 * | 6/2001 | Henry et al. | 264/496 |
| 6,373,615 B1 | 4/2002 | Mann et al. | |

* cited by examiner

Primary Examiner—James J. Seidleck
Assistant Examiner—Sanza L. McClendon
(74) Attorney, Agent, or Firm—Crowell & Moring LLP

(57) ABSTRACT

A high refractive index, curable, synthetic resin composition comprising a core resin composition composed of a mixture of ethylenically unsaturated compounds, and an initiation system containing both photo and thermal initiators, particularly a photochromic resin composition which further includes at least one photochromic dye. Also a curing process, which includes a combination of multi-step radiation curing and thermal annealing. Articles produced of cured composition exhibit superior physical and, in appropriate cases, photochromic properties and can be easily mass produced on a commercial scale due to short processing time and use of readily available chemicals.

32 Claims, No Drawings

HIGH INDEX CURABLE PHOTOCHROMIC COMPOSITION AND ITS PROCESS

This application claims the benefit of U.S. Provisional Application Ser. Nos. 60/329,086, filed Oct. 12, 2001, and 60/328,810, filed Oct. 15, 2001.

FIELD OF THE INVENTION

This invention relates to a high refractive index curable synthetic resin composition; to a process for curing such a composition; and to a cured article formed thereof.

BACKGROUND OF THE INVENTION

Currently, commercial photochromic plastic lenses with photochromic dyes dispersed throughout the lens substrate are made by thermal processes. These processes yield product with good mechanical, optical and photochromic properties, but they require normally around 20 hours before the curing is complete. Examples of such thermally cured lenses are disclosed in U.S. Pat. No. 5,763,511, to Chan et al.; U.S. Pat. No. 5,973,039, to Florent et al.; and U.S. Pat. No. 6,034,193, to Henry et al.

Attempts have also been made to produce synthetic resin lenses by radiation curing. Examples of such attempts to produce radiation cured lenses are described in U.S. Pat. No. 5,621,017, to Kobayakawa et al., and U.S. Pat. No. 5,910,516, to Imura et al. Although the use of radiation curing makes it possible to reduce processing time, the resulting lenses have not found successful commercial application due to one or more of the following reasons:

(1) inferior thermal/mechanical properties, (2) poor optical and/or photochromic properties, and (3) lack of commercial capability for mass production.

Thus, despite the efforts of the prior art to make synthetic resin lenses through radiation curing, there are still no commercial photochromic lenses produced via radiation cure in the market. There has remained a need to solve these problems by finding a proper radiation curable photochromic composition, along with the process to produce superior synthetic resin lenses.

SUMMARY OF THE INVENTION

The goal of the invention is thus to develop a curable core resin composition which can be cured rapidly by radiation curing methods and/or thermally to produce synthetic resin lenses with desirable thermal and mechanical properties, good optical characteristics and, in the case of photochromic lenses, photochromic characteristics, and which are capable of mass production on a commercial scale. This goal is fulfilled by the present invention as described and claimed hereinafter.

Specifically, we have discovered a new curable core resin composition suitable for photochromic dyes, along with a new initiation system containing both photo and thermal initiators. The unique cure process includes combination of both step radiation cure and thermal annealing, leading to lenses with superior physical and/or photochromic properties in as little as one hour.

In a first aspect, the present invention discloses a high refractive index curable synthetic resin composition comprising a core resin composition of ethylenically unsaturated compounds and a photo initiator and a thermal initiator.

In accordance with a further aspect of the invention the synthetic resin composition further comprises at least one photochromic dye and is suitable for the production of photochromic lenses. The disclosed photochromic composition provides superior photochromic properties and physical properties, short processing time through both step radiation and thermal curing, and easy commercial capability for mass production.

The present invention also describes a radiation curing process of the disclosed compositions via a single stage cure or via a multiple stage cure with an appropriate cooling period at the end of each cure stage, followed by thermal annealing.

DETAILED DESCRIPTION OF PREFERRED EMBODIMENTS

The present invention may be understood more readily by reference to the following detailed description of particular embodiments of the invention and the specific examples included therein. Before the present compositions and their process are disclosed and described, it is to be understood that this invention is not limited to a particular formulation and a process, as such may, of course, vary. It is also to be understood that the terminology used herein is for the purpose of describing particular embodiments only and is not intended to be limiting. As used herein, the term "(meth) acrylate" is intended to refer generally to both acrylate and methacrylate functional groups.

The present invention discloses a high refractive index curable core resin composition suitable for photochromic application. When proper photochromic dyes, initiation system containing both photo and thermal initiators and additives are incorporated into the disclosed composition, lenses with superior physical and photochromic properties can be made through the disclosed curing process.

In one aspect, the core resin composition suitable for photochromic application comprises per 100 parts by weight, and may include:

(i) from 2 to 70 parts by weight of at least one first compound corresponding to formula (I):

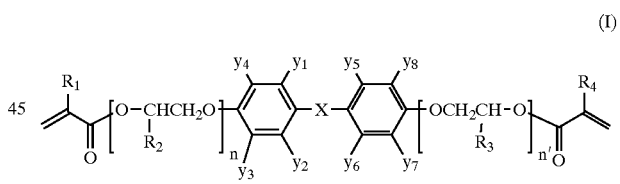

wherein
n and n' independently are 0–30
$R_1$–$R_4$ independently represent H or $C_1$–$C_6$ alkyl,
X is O, S, $SO_2$, $CO_2$, $CH_2$, CH=CH, $C(CH_3)_2$ or a single bond, and
$y_1$–$y_8$ independently represent H, OH, halogen, mercaptan or $C_1$–$C_4$ alkyl;

(ii) from 2 to 80 parts by weight of at least one second compound corresponding to formula (II):

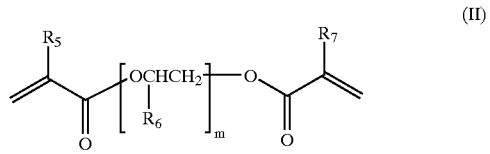

wherein m is at least 1, and $R_5$–$R_7$ independently represent H or $C_1$–$C_6$ alkyl;

(iii) from 2 to 60 parts by weight of a reactive diluent selected from the group consisting of 1,6-hexanediol di(meth)acrylate, isobornyl (meth)acrylate, 2-hydroxyethyl (meth)acrylate, 2-phenoxyethyl (meth)acrylate, vinyl benzoate, vinyl 4-t-butyl benzoate, styrene, divinyl benzene, polyethylene glycol di(meth)acrylate, polypropylene glycol di(meth)acrylate and mixtures thereof; and (iv) from 2 to 60 parts by weight of a multi-functional (meth)acrylate or (meth)acrylate derivative with three or more acrylate functional groups selected from the group consisting of trimethylolpropane tri(meth)acrylate, pentaerythritol tri(meth)acrylate, glyceryl tri(meth)acrylate, pentaerythritol tetra(meth)acrylate, di-trimethylolpropane tetra(meth)acrylate, dipentaerythritol penta(meth)acrylate, penta(meth)acrylate ester and mixtures thereof.

In preferred compounds of formula I, $R_1$ and $R_4$ are $CH_3$; $R_2$, $R_3$, and $y_1$–$y_8$ are hydrogen; and X is $C(CH_3)_2$. n and n' are preferably 3 to 5. In preferred compounds of formula II, $R_5$ and $R_7$ are $CH_3$, and $R_6$ is hydrogen.

To make a photochromic article, the core resin composition of the invention may further comprise an effective photochromic amount of at least one photochromic dye incorporated therein to form photochromic lenses which darken when exposed to bright light and fade when under less intense light exposure. Suitable photochromic dyes may, for example, comprise chromenes, fulgides, fulgimides, spirooxazines, naphthopyrans, and/or mixtures thereof. Examples of useful photochromic dye compounds and/or mixtures are disclosed in U.S. Pat. Nos. 5,399,687; 5,498,686; 5,623,005; 5,645,768; 5,707,557; 5,801,243; 5,932,725; 5,952,515; 5,990,305; 6,022,496; 6,036,890; 6,102,543; 6,146,554; 6,171,525; 6,190,580 and 6,225,466, the entire disclosures of which are incorporated herein by reference. The amount of the photochromic dye or dye mixture may vary depending on the desired photochromic effect, but typically will amount to from 0.0001 to 1, preferably 0.0001 to 0.1, and particularly preferably 0.001 to 0.1, part by weight per 100 parts by weight of the core resin. The selection of specific dyes or dye mixtures to be used in any given case will depend on the desired coloration, as well as the desired performance characteristics of the resulting lens, such as darkening rate and/or fade rate, and is considered to be within the skill of the art. A suitable neutral gray photochromic dye mixture is described in U.S. Pat. No. 6,373,615, at, for example, column 10, line 50+, the entire disclosure of which is incorporated herein by reference. In one preferred aspect, a resin composition includes 0.05 to 0.06%, more preferably 0.056%, photochromic dye mixture by weight of the core resin composition, including 380 to 460 ppm, more preferably 423 ppm, spiro-9-floureno-13'-(6-methoxy-3-(4-N-morpholinyl)phenyl-3-phenyl-indeno[2,1-f]naphtho(1,2-b)pyrane (gray-blue), 40 to 60 ppm, more preferably 46 ppm, of 3-phenyl-3'-(4-N-piperidinyl)-phenyl-6-N-morpholinyl-3H-naphtho[2,1-b]pyrane (ruby), 45 to 65 ppm, more preferably 54 ppm, of 3-phenyl-3'-(4-N-morpholinyl)-phenyl)-6-N-morpholinyl-3H-naphtho[2,1-b]pyrane (orange), and 30 to 50 ppm, more preferably 38 ppm, of 3-phenyl-3'-(4-methoxy)-phenyl-6-N-morpholinyl-3H-naphtho[2,1-b]pyrane (yellow).

To form a radiation curable synthetic resin composition, especially a short wavelength, visible light, radiation curable composition, a suitable photo initiator may be incorporated in the core resin composition. Typically the resin composition will include from 0.01 to 3, and preferably 0.02 to 1, part by weight of photo initiator per 100 parts by weight of the core resin. Examples of suitable photo initiators include benzophenone, 2,2-dimethoxy-2-phenyl acetophenone, 1-hydroxycyclohexyl phenyl ketone, 2-methyl-1-[4-(methylthio)phenyl]-2-morpholino propan-1-one, 2-hydroxy-2-methyl-1-phenyl-propan-1-one, bis(2,6-dimethoxybenzoyl)-2,4,4-trimethylpentyl phosphine oxide, 2,4,6-trimethylbenzoyl diphenylphosphine oxide, bis(2,4,6-trimethylbenzoyl)-phenylphosphine oxide and mixtures thereof. Preferred photo initiators include 2,4,6-trimethylbenzoyl diphenylphosphine oxide, bis(2,4,6-trimethylbenzoyl)-phenylphosphine oxide, or mixtures thereof.

If desired, a thermal polymerization initiator may also be incorporated in the synthetic resin composition to facilitate use of thermal curing or combination radiation/thermal curing process techniques. For example, the resin composition may advantageously contain from 0.01 to 3, and preferably 0.02 to 1, part by weight of a thermal initiator per 100 parts by weight of the core resin. Examples of suitable thermal initiators include t-amyl peroxy-2-ethylhexanoate, t-butyl peroxy-2-ethylhexanoate, t-butyl peroxyl-2-methylbenzoate, 1,1-di-(t-butylperoxy)-3,3,5-trimethylcyclohexane, t-butyl peroxy-3,5,5-trimethylhexanoate, t-butyl peroxy 2-ethylhexyl carbonate, dibenzoyl peroxide, t-amyl peroxy benzoate, 2,2'-azobis(2,4-dimethylpentanenitrile), 2,2'azobis(2-methylpropanenitrile), 2,2'azobis(2-methylbutanenitrile), 1,1'azobis(cyclohexane-carbonitrile), and mixtures thereof. Particularly preferred thermal initiators include 2,2'-azobis(2,4-dimethylpentanenitrile), 2,2'azobis(2-methylpropanenitrile), 2,2'azobis(2-methylbutanenitrile), 1,1'azobis(cyclohexanecarbonitrile), or mixtures thereof.

In one preferred aspect, the resin composition comprises an initiator mixture comprising both a photo initiator and a thermal initiator. Castable resin compositions according to the invention desirably will have a viscosity of less than 400 cps at room temperature.

The curable synthetic resin composition of the invention may also comprise up to 5 parts by weight of other additives, such as light stabilizers, mold release agents and/or other processing agents, per 100 parts by weight of the core resin composition. For example a benzophenone UV absorber, such as 2-hydroxy-4-methoxybenzophenone, may be included in the resin composition in an amount from about 50 ppm to about 1,000 ppm, preferably from about 100 ppm to about 500 ppm, and more preferably about 150 ppm to 300 ppm. In one preferred aspect, a resin composition includes 0.019% 2-hydroxy-4-methoxybenzophenone and 0.056% photochromic dye mixture by weight of the core resin composition. One effective processing agent is isopropylxanthic disulfide, which extends pot life and minimizes yellowing of the resin. Pot life is the time from when a resin batch is prepared until the last acceptable lens can be produced from that particular batch. In manufacturing photochromic resins, the possibility of yellowness increases after initiators are mixed with the resins, thus the ability to extend pot life is a useful benefit.

The present invention also discloses a radiation cure process in which a mold assembly is filled with a curable synthetic resin composition as described above and the filled mold assembly is subjected to a source of actinic radiation. Desirably the radiation source is a filtered actinic radiation source having a primary output at or above the cutoff wavelength of the filter. Where the synthetic resin composition is intended to produce a photochromic article and contains a photochromic dye which is activated at certain visible wavelengths, e.g. wavelengths above 400 nm, it is advantageous to use a filter to cut off substantially all (e.g., 99% or more) of the radiation up to the wavelength where the photochromic dye is active, so that the photochromic dye will not be activated or darkened during the curing process.

The radiation curing process may comprise either a single stage cure up to 30 minutes in length or a multiple stage cure comprising a plurality of stages from 10 seconds to 20 minutes in duration. The use of the multiple stage procedure is advantageous in order to facilitate control of the rate of reaction and the temperature of the resin during curing depending on the type of lenses being processed. It is also desirable to have adequate cooling time and cooling media at the end of each radiation stage to further control the rate of cure and the temperature of the resin. Suitable cooling media include ambient air, chilled air, ambient water and/or chilled water. The multiple stage radiation and cooling process permits rapid effective curing while keeping the temperature of the lens material below the temperature where thermal polymerization of the resin becomes uncontrollable and the reaction autoaccelerates. This maximizes the yield of the process, optimizing optical, physical, and photochromic properties of the cured article.

In one preferred aspect, after the radiation cure it is desirable to have a thermal anneal at a temperature of 50 to 150° C. for up to 2 hours. While various thermal curing processes are suitable subsequent to the radiation exposure process described above, the following temperature profile has provided acceptable results. After a radiated lens is placed in the oven, the oven temperature is maintained at 60° C. for 15 minutes; the temperature is then raised at a rate of 3.3° C./minute to 76° C. and is maintained at 76° C. for 10 minutes. The temperature is then raised at a rate of 3.3° C./minute to 100° C. and is maintained at 100° C. for 35 minutes. Thereafter, the temperature of the oven is allowed to cool to room temperature. The thermal annealing may be carried out prior to and/or after removing the plastic lens from the mold assembly in which it is formed.

The invention also relates to an article, especially a photochromic article, made by molding and curing a synthetic resin composition as described above.

The following table describes a number of methods for producing lenses with acceptable optical, physical, and photochromic performance when cast using the formulation(s) described in this patent.

TABLE I

Methods for producing lenses

| Cure Example | Description |
|---|---|
| 1 | Using 420 nm peak output low pressure Hg lamps spaced three to six inches apart and GG420 glass as a filter, expose both sides of the lens or article for 20 minutes. Following the radiation exposure, the articles were put into an oven at 120° C. for 25 to 30 minutes. |
| 2 | Using 420 nm peak output low pressure Hg lamps spaced three to six inches apart and GG420 glass as a filter, expose both sides of the lens or article for 2.75 to 3 minutes. After this initial exposure, the gasket was removed from the article and exposed to the actinic light for an additional 9 minutes. Following the radiation exposure, the articles were put into an oven at 80° C. for 25 to 30 minutes. |
| 3 | Using 420 nm peak output low pressure Hg lamps spaced three to six inches apart and GG420 glass as a filter, both sides of the lens or article were exposed for 12 minutes continuously. Following the radiation exposure, the articles were put into an oven at 70 to 90° C. for 30 to 60 minutes. |

TABLE I-continued

Methods for producing lenses

| Cure Example | Description |
|---|---|
| 4 | Using 420 nm peak fluorescent tubes spaced three to seven inches apart as well as GG420 glass placed between the lamps and the lens/article being cured, lenses were cured as follows. Lenses were placed on a conveyor belt with 3 curing zones and 2 cooling zones. The exposure consisted of an initial 2.75-minute actinic light exposure followed by a 1.25 minutes period out of the light with an ambient temperature of 55° F. to 75° F. This was repeated and then followed by another 2.75 minute exposure and quenching into 20° C. water for 2 minutes. After the final portion of the radiation exposure process, lenses were placed in an oven 45 to 90 minutes at temperatures between 60 and 100° C. |
| 5 | Using 420 nm peak fluorescent tubes spaced three to seven inches apart as well as GG420 glass placed between the lamps and the lens/article being cured, lenses were cured as follows. The exposure consisted of an initial 2.75-minute actinic light exposure followed by a 1.25 minutes period out of the light. This was repeated and then followed by another 2.75 minute exposure and quenching into 20° C. water for 2 minutes. After the final portion of the radiation exposure process, lenses were placed in an oven 45 to 90 minutes at temperatures between 60 and 100° C. |
| 6 | Using 420 nm peak fluorescent tubes spaced three to seven inches apart as well as GG420 glass placed between the lamps and the lens/article being cured, lenses were cured as follows. The exposure consisted of an initial 3 minutes actinic light exposure after which the gasket was removed. The article was then exposed to actinic light two more times for 3.5 minutes each time. Following the actinic light exposure, the lenses were placed in an oven for 1 hour at 60° C., followed by 1 hour a 70° C. |
| 7 | Using 420 nm peak output low pressure Hg lamps spaced three to six inches apart and GG420 glass as a filter, expose both sides of the lens or article for 3 minutes continuously. After this initial exposure, lenses were exposed using 420 nm peak fluorescent tubes spaced three to seven inches apart as well as GG420 glass placed between the lamps and the lens/article being cured by continuous exposure from both sides for 7 minutes. Following the radiation exposure, the articles were put into an oven at 70° C. for 30 to 60 minutes. |
| 8 | Using 420 nm peak fluorescent tubes spaced three to seven inches apart as well as GG420 glass placed between the lamps and the lens/article being cured, lenses were cured as follows. Lenses were placed on a conveyor belt that carries the lenses between the lamps. The method consisted of exposing the lenses for 4.25 minutes twice. After the final portion of the radiation exposure process, lenses were placed in an oven 45 to 90 minutes at temperatures between 60 and 100° C. |
| 9 | Using 420 nm peak fluorescent tubes spaced three to seven inches apart as well as GG420 glass placed between the lamps and the lens/article being cured, lenses were cured as follows. Lenses were placed on a conveyor belt and exposed to the actinic light source described for 9 minutes. After the final portion of the radiation exposure process, lenses were placed in an oven 30 to 90 minutes at temperatures between 60 and 100° C. |
| 10 | Using 420 nm peak output low pressure Hg lamps spaced three to six inches apart and GG420 glass as a filter, expose both sides of the lens or article for 10 minutes continuously. Following the radiation exposure, the articles were put into an oven at 120° C. for 25 to 30 minutes. |
| 11 | Using 420 nm peak output low pressure Hg lamps spaced three to six inches apart and GG420 glass as a filter, lenses were exposed from each side separately using shutters to control the exposure time from each side. The reaction was monitored using a thermocouple embedded in the lens so the temperature could be controlled as low as possible. Exposure times were from 30 seconds to 4 minutes per side. Following the radiation exposure, the articles were put into an oven at 60 to 120° C. for 20 to 90 minutes. |

TABLE I-continued

Methods for producing lenses

| Cure Example | Description |
|---|---|
| 12 | Using 420 nm peak fluorescent tubes spaced three to seven inches apart as well as GG420 glass placed between the lamps and the lens/article being cured, lenses were cured as follows. Lenses were placed on a conveyor belt with 3 curing zones and 2 cooling zones. The exposure consisted of an initial 2.75-minute actinic light exposure followed by a 1.25 minutes period out of the light with an ambient temperature of 55° F. to 75° F. This was repeated and then followed by another 2.75 minutes exposure. This whole exposure was repeated and then followed by placing the lens into cool water. After the final portion of the radiation exposure process, lenses were placed in an oven 45 to 90 minutes at temperatures between 60 and 100° C. |

The following tables exhibit examples of photochromic compositions, process and physical properties of the resulting cured articles. Examples 1–28 below, employ formula (Ia) where n=n'=3, $R_1$–$R_4$=$CH_3$, X=$C(CH_3)_2$, and $y_1$–$y_8$=H; formula (Ib) where n=n'=5, $R_1$–$R_4$=$CH_3$, X=$C(CH_3)_2$, and $y_1$–$y_8$=H; Formula (IIa) where $m_{avg}$=9, $R_5$ and $R_7$=$CH_3$, and $R_6$=H (polyethylene glycol 400 dimethacrylate); and Formula (IIb) where $m_{avg}$=4 to 5, $R_5$ and $R_7$=$CH_3$, and $R_6$=H (polyethylene glycol 200 dimethacrylate) in the amounts indicated in the table. Bis(2,4,6-trimethylbenzoyl)-phenylphosphine oxide at 0.04% and 2,2'-azobis(2,4-dimethylpentanenitrile) at 0.05% were used as photo and thermal initiators, respectively, based on 100 parts by weight of core resin. A neutral gray photochromic dye mixture, at 0.073%, and a UV-absorber, 2-hydroxy-4-methoxybenzophenone, at 0.025%, were also employed. Isopropylxanthic disulfide was used at 0.03%, based on 100 parts by weight of core resin, in examples 1–5. During one hour mixing at room temperature with the photochromic dye mixture, nitrogen bubbling was employed, followed by degassing under vacuum for 15 minutes. The dye mixture employed in these examples includes a combination of 550 ppm spiro-9-floureno-13'-(6-methoxy-3-(4-N-morpholinyl)phenyl-3-phenyl-indeno[2,1-f]naphtho(1,2-b)pyrane (gray-blue), 60 ppm of 3-phenyl-3'-(4-N-piperidinyl)-phenyl-6-N-morpholinyl-3H-naphtho[2,1-b]pyrane (ruby), 70 ppm of 3-phenyl-3'-(4-N-morpholinyl)-phenyl)-6-N-morpholinyl-3H-naphtho[2,1-b]pyrane (orange), and 50 ppm of 3-phenyl-3'-(4-methoxy)-phenyl-6-N-morpholinyl-3H-naphtho[2,1-b]pyrane (yellow), which provides a gray photochromic dye blocking visible light. All samples were cured under low pressure Hg lamp with 420 nm peak output for 15 to 20 minutes at an intensity of 2.5 mw/cm$^2$ with GG420 filter glass (from Schott), followed by annealing at 120° C. for 25 to 30 minutes.

TABLE 2

Formulation (by wt) of core resin

| Example No. | Formula (Ia) | Formula (Ib) | Formula (IIa) | Formula (IIb) | Styrene | Divinyl Benzene | Dipentaerythritol Pentaacrylate |
|---|---|---|---|---|---|---|---|
| 1 | 0 | 29.3 | 41.5 | 0.0 | 18.0 | 0.0 | 11.3 |
| 2 | 10 | 19.3 | 41.5 | 0.0 | 18.0 | 0.0 | 11.3 |
| 3 | 20 | 9.3 | 41.5 | 0.0 | 18.0 | 0.0 | 11.3 |
| 4 | 0 | 29.3 | 31.5 | 10.0 | 18.0 | 0.0 | 11.3 |
| 5 | 0 | 29.3 | 21.5 | 20.0 | 18.0 | 0.0 | 11.3 |
| 6 | 0 | 39.3 | 24.0 | 0.0 | 18.0 | 0.0 | 18.8 |
| 7 | 0 | 45.3 | 18.0 | 0.0 | 18.0 | 0.0 | 18.8 |
| 8 | 0 | 39.3 | 18.0 | 0.0 | 18.0 | 0.0 | 24.8 |
| 9 | 0 | 39.3 | 24.0 | 0.0 | 0.0 | 18.0 | 18.8 |
| 10 | 0 | 45.3 | 18.0 | 0.0 | 0.0 | 18.0 | 18.8 |
| 11 | 0 | 39.3 | 18.0 | 0.0 | 0.0 | 18.0 | 24.8 |
| 12 | 0 | 39.8 | 17.0 | 0.0 | 15.8 | 10.8 | 16.5 |
| 13 | 0 | 34.5 | 17.0 | 0.0 | 15.8 | 10.8 | 21.8 |
| 14 | 0 | 39.8 | 17.0 | 0.0 | 10.8 | 15.8 | 16.5 |
| 15 | 0 | 34.5 | 17.0 | 0.0 | 10.8 | 15.8 | 21.8 |
| 16 | 0 | 36.3 | 14.0 | 0.0 | 24.4 | 4.0 | 21.3 |
| 17 | 0 | 41.0 | 14.0 | 0.0 | 21.0 | 7.4 | 16.6 |
| 18 | 0 | 30.0 | 15.6 | 0.0 | 24.4 | 4.0 | 26.0 |
| 19 | 0 | 41.0 | 17.1 | 0.0 | 21.4 | 4.0 | 16.5 |
| 20 | 0 | 32.6 | 17.1 | 0.0 | 20.9 | 5.9 | 23.5 |
| 21 | 0 | 36.3 | 14.0 | 0.0 | 17.6 | 10.8 | 21.3 |
| 22 | 0 | 41.0 | 14.0 | 0.0 | 13.2 | 10.8 | 21.0 |
| 23 | 0 | 31.1 | 24.0 | 0.0 | 24.4 | 4.0 | 16.5 |
| 24 | 0 | 31.6 | 14.0 | 0.0 | 17.6 | 10.8 | 26.0 |
| 25 | 0 | 41.0 | 14.0 | 0.0 | 21.0 | 7.4 | 16.6 |
| 26 | 0 | 30.0 | 24.0 | 0.0 | 17.6 | 10.8 | 17.6 |
| 27 | 0 | 36.0 | 19.0 | 0.0 | 17.6 | 10.8 | 16.5 |
| 28 | 0 | 36.0 | 19.0 | 0.0 | 24.4 | 4.0 | 16.5 |

TABLE 3

Properties of cured photochromic samples

| Example No. | Compared to ColorMatic extra gray* | | | Refractive Index | Abbe Value | Flex modulus (kpsi) |
|---|---|---|---|---|---|---|
| | Activation | Darkness | Deactivation | | | |
| 1 | Slower | similar | Faster | 1.5413 | 41.8 | 123 |
| 2 | Slower | similar | Faster | 1.5398 | 40.8 | 143 |
| 3 | Slower | lighter | Faster | 1.5423 | 40.5 | 152 |
| 4 | Slower | lighter | Faster | 1.5436 | 41.2 | 167 |
| 5 | Slower | lighter | Faster | 1.5413 | 41.1 | 179 |
| 6 | Similar | similar | Faster | 1.5396 | 41.9 | 115 |
| 7 | Similar | similar | Faster | 1.5396 | 42.2 | 120 |
| 8 | Similar | darker | Faster | 1.5403 | 41.6 | 136 |
| 9 | Faster | darker | Much faster | 1.5426 | 41.1 | 80 |
| 10 | Faster | darker | Much faster | 1.5461 | 38.4 | 79 |
| 11 | Faster | darker | Much faster | 1.5451 | 39.1 | 81 |
| 12 | Faster | darker | Faster | 1.5542 | 38.8 | 168 |
| 13 | Faster | darker | Faster | 1.5516 | 38.4 | 159 |
| 14 | Faster | darker | Faster | 1.5533 | 38.7 | 149 |
| 15 | Faster | darker | Faster | 1.5510 | 38.8 | 162 |
| 16 | Slower | lighter | Faster | 1.5529 | 39 | 195 |
| 17 | Slower | similar | Faster | 1.5522 | 39 | 178 |
| 18 | Similar | similar | Faster | 1.5450 | 41.8 | 197 |
| 19 | Similar | similar | Faster | 1.5496 | 38.8 | 168 |
| 20 | Faster | darker | Faster | 1.5493 | 39.6 | 174 |
| 21 | Faster | similar | Faster | 1.5525 | 39.7 | 173 |
| 22 | Faster | darker | Faster | 1.5493 | 39.3 | 132 |
| 23 | Similar | similar | Faster | 1.5484 | 40.2 | 174 |
| 24 | Faster | Darker | Faster | 1.5506 | 39.9 | 175 |
| 25 | Faster | Darker | Faster | 1.5532 | 39.1 | 195 |
| 26 | Faster | Darker | Faster | 1.5494 | 39.3 | 174 |
| 27 | Faster | Darker | Faster | 1.5514 | 39.4 | 174 |
| 28 | Slower | Similar | Faster | 1.5493 | 39.6 | 191 |

*ColorMatic extra gray is the best photochromic lenses in over-all properties on the market and is produced by Optische Werke G. Rodenstock located in Munich, Germany. Photochromic properties were obtained after exposure under the natural sun light.

Thicker lenses may also be produced according to the principles of the invention. Because slower heat transfer rates are associated with thicker lenses, the processing temperatures of the material employed in thicker lens tend to be higher and the selection of thermal initiators may be affected. For example, a useful monomer charge for a typical lens may be 24.37% styrene, 3.99% divinylbenzene, 0.05% 2,2'-azobis(2,4-dimethylpentanenitrile), 0.04% bis(2,4,6-trimethylbenzoyl)-phenylphosphine oxide, 0.20% triphenyl phosphine, 6.29% polyethylene glycol (PEG 400), 36.18% bisphenol A, 21.22% dipentaerythritol pentaacrylate, and 7.67% photochromic dyes. The monomer charge for a similar, but thicker, lens may substitute thermal initiator 1,1'azobis(cyclohexane-carbonitrile) for 2,2'-azobis(2,4-dimethylpentanenitrile).

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A high refractive index core resin composition comprising (i) 2 to 70 parts by weight of at least one first compound corresponding to formula (I):

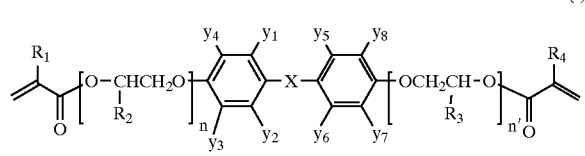

(I)

wherein n and n' independently are 3–5, $R_1$–$R_4$ independently represent H or $C_1$–$C_6$ alkyl, X is O, S, $SO_2$, $CO_2$, $CH_2$, CH=CH, $C(CH_3)_2$ or a single bond, and $y_1$–$y_8$ independently represent H, OH, halogen, mercaptan or $C_1$–$C_4$ alkyl, (ii) 2 to 80 parts by weight of at least one second compound corresponding to formula (II):

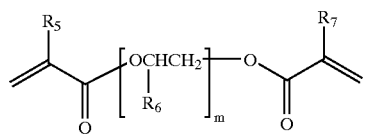

(II)

wherein m is at least 1, and $R_5$–$R_7$ independently represent H or $C_1$–$C_6$ alkyl;

(iii) 2 to 60 parts by weight of a reactive diluent selected from the group consisting of 1,6-hexanediol di(meth)acrylate, trimethylolpropane tri(meth)acrylate, isobornyl (meth)acrylate, 2-hydroxyethyl (meth)acrylate, 2-phenoxyethyl (meth)acrylate, vinyl benzoate, vinyl 4-t-butyl benzoate, styrene, divinyl benzene, and mixtures thereof; and (iv) 2 to 60 parts by weight of a multi-functional (meth)acrylate or (meth)acrylate derivative with three or more acrylate functional groups selected from the group consisting of trimethylolpropane tri(meth)acrylate, pentaerythritol tri(meth)acrylate, glyceryl tri(meth)acrylate pentaerythritol tetra(meth)acrylate, di-trimethylolpropane tetra(meth)acrylate, dipentaerythritol penta(meth)acrylate, penta(meth)acrylate ester and mixtures thereof;

per 100 total parts by weight of components (i), (ii), (iii) and (iv), the composition further comprising (v) 0.0001 to 1.0 part by weight of at least one photochromic dye;

(vi) 0.01 to 3 part by weight of a photo initiator;

(vii) 0.01 to 3 part by weight of a thermal initiator; and (viii) up to 5 total parts by weight of other additives selected from the group consisting of light stabilizers, mold release agents and processing agents.

2. A composition according to claim 1, wherein $R_1$, $R_4$, $R_5$, $R_7$ are $CH_3$, $R_2$, $R_3$, $R_6$ are hydrogen, $y_1$–$y_8$ are hydrogen, and X is $C(CH_3)_2$.

3. A composition according to claim 1, further comprising isopropylxanthic disulfide.

4. A composition according to claim 1, wherein said at least one photochromic dye is selected from the group consisting of chromenes, fulgides, fulgimides, spirooxazines, naphthopyrans, and mixtures thereof.

5. A composition according to claim 1, wherein the composition is radiation curable.

6. A composition according claim 5, wherein the composition is ultraviolet radiation curable.

7. A composition according to claim 1, wherein the photo initiator is selected from the group consisting of benzophenone, 2,2-dimethoxy-2-phenyl acetophenone, 1-hydroxycyclohexyl phenyl ketone, 2-methyl-1-[4-(methylthio)phenyl]-2-morpholino propan-1-one, 2-hydroxy-2-methyl-1-phenyl-propan-1-one, bis(2,6-dimethoxybenzoyl)-2,4,4-trimethylpentyl phosphine oxide, 2,4,6-trimethylbenzoyl diphenylphosphine oxide, bis(2,4,6-trimethylbenzoyl)-phenylphosphine oxide, and mixtures thereof.

8. A composition according to claim 7, wherein the photo initiator comprises 2,4,6-trimethylbenzoyl diphenylphosphine oxide, bis(2,4,6-trimethylbenzoyl)-phenylphosphine oxide or mixtures thereof.

9. A composition according to claim 1, wherein the thermal initiator is selected from the group consisting of t-amyl peroxy-2-ethylhexanoate, t-butyl peroxy-2-ethylhexanoate, t-butyl peroxyl-2-methylbenzoate, 1,1-di-(t-butylperoxy)-3,3,5-trimethylcyclohexane, t-butyl peroxy-3,5,5-trimethylhexanoate, t-butyl peroxy 2-ethylhexyl carbonate, dibenzoyl peroxide, t-amyl peroxy benzoate, 2,2'-azobis(2,4-dimethylpentanenitrile), 2,2'azobis(2-methylpropanenitrile), 2,2'azobis(2-methylbutanenitrile), 1,1'azobis(cyclohexanecarbonitrile), and mixtures thereof.

10. A composition according to claim 9, wherein the thermal initiator comprises 2,2'-azobis(2,4-dimethylpentanenitrile), 2,2'azobis(2-methylpropanenitrile), 2,2'azobis(2-methylbutanenitrile), 1,1'azobis (cyclohexanecarbonitrile) or mixtures thereof.

11. A composition according to claim 1, wherein said composition has a viscosity of less than 400 cps at room temperature.

12. A process of producing a cured synthetic resin article comprising:

(i) filling a mold assembly with a synthetic resin composition; and (ii) curing the resin composition by subjecting the filled mold to radiation from an actinic radiation source, wherein the synthetic resin composition is a high refractive index core resin composition comprising:

(i) 2 to 70 carts by weight of at least one first compound corresponding to formula (I):

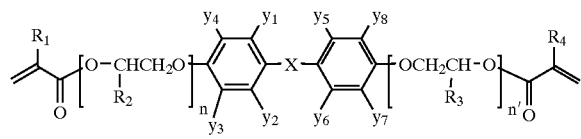

wherein n and n' independently are 3–5, $R_1$–$R_4$ independently represent H or $C_1$–$C_6$ alkyl, X is O, S, $SO_2$, $CO_2$, $CH_2$, CH=CH, $C(CH_3)_2$ or a single bond, and $y_1$–$y_8$ independently represent H, OH, halogen, mercaptan or $C_1$–$C_4$ alkyl, (ii) 2 to 80 parts by weight of at least one second compound corresponding to formula (II):

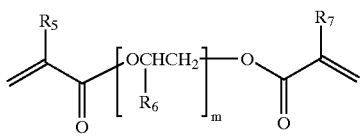

wherein m is at least 1, and $R_5$–$R_7$ independently represent H or $C_1$–$C_6$ alkyl;

(iii) 2 to 60 parts by weight of a reactive diluent selected from the group consisting of 1,6-hexanediol di(meth)acrylate, trimethylolpropane tri(meth)acrylate, isobornyl (meth)acrylate, 2-hydroxyethyl (meth)acrylate, 2-phenoxyethyl (meth)acrylate, vinyl benzoate, vinyl 4-t-butyl benzoate, styrene, divinyl benzene, and mixtures thereof; and (iv) 2 to 60 parts by weight of a multi-functional (meth)acrylate or (meth)acrylate derivative with three or more acrylate functional groups selected from the group consisting of trimethylolpropane tri(meth)acrylate, pentaerythritol tri(meth)acrylate, glyceryl tri(meth)acrylate pentaerythritol tetra(meth)acrylate, di-trimethylolpropane tetra(meth)acrylate, dipentaerythritol penta(meth)acrylate, penta(meth)acrylate ester and mixtures thereof;

per 100 total parts by weight of components (i), (ii), (iii) and (iv), the composition further comprising (v) 0.0001 to 1.0 part by weight of at least one photochromic dye;

(vi) 0.01 to 3 part by weight of a photo initiator; and (vii) 0.01 to 3 part by weight of a thermal initiator, and wherein the synthetic resin composition has a viscosity of less than 400 cps at room temperature.

13. A process according to claim 12, wherein said radiation source is a filtered actinic radiation source.

14. A process according to claim 13, wherein the filter has a cutoff wavelength at or below the radiation source's primary output wavelength.

15. A process according to claim 12, wherein the filled mold is subjected to radiation in a single stage radiation exposure step of up to 30 minutes duration.

16. A process according to claim 12, wherein the filled mold is subjected to radiation in a multiple stage radiation cure comprising a plurality of radiation exposure steps of from about 10 seconds to about 20 minutes duration each with intervening cooling periods.

17. A process according to claim 16, wherein the intervening cooling is effected by exposing the filled mold at the end of each radiation exposure step to a cooling medium selected from the group consisting of ambient air, chilled air, ambient water and chilled water.

18. A process according to claim 16, wherein the synthetic resin composition is subjected to radiation from the actinic radiation source until the composition approaches its thermal polymerization reaction initiation temperature.

19. A process according to claim 12, wherein the curing step further comprises subjecting the synthetic resin composition to radiation from the actinic radiation source until the composition approaches its thermal polymerization reaction initiation temperature, cooling the synthetic resin composition, again subjecting the synthetic resin composition to radiation from the actinic radiation source until the composition approaches its thermal polymerization reaction initiation temperature, again cooling the synthetic resin composition, wherein the radiation and cooling steps are repeated until the synthetic resin composition is substantially cured.

20. A process according to claim 12, further comprising (iii) thermally annealing the radiation cured composition.

21. A process according to claim 20, wherein the cured composition is thermally annealed at a temperature of from about 50 to about 150° C. for up to about 2 hours.

22. A process according to claim 20, wherein the cured composition is thermally annealed prior to removal from the mold assembly.

23. A process according to claim 20, wherein the cured composition is thermally annealed after removal from the mold assembly.

24. A process according to claim 20, wherein thermal annealing is effected both prior to and after removal of the cured composition from the mold assembly.

25. A process according to claim 12, wherein a radiation filter, which cuts off 99% of UV radiation up to 400 nm is placed between the radiation source and the photochromic composition so that the photochromic dye is not activated during the radiation exposure.

26. A process according to claim 12, wherein a radiation filter, which cuts off substantially all UV radiation up to a wavelength at which the photochromic dye is not active, is placed between the radiation source and the photochromic composition so that the photochromic dye is not activated during the radiation exposure.

27. A synthetic resin article made from a radiation cured resin composition according to claim 1.

28. A synthetic resin article according to claim 25, wherein the resin composition is cured by combined radiation and thermal curing.

29. A synthetic resin article according to claim 25, wherein the cured resin composition is subjected to thermal annealing.

30. A process of producing a cured synthetic resin article comprising:

filling a mold assembly with a synthetic resin composition; and curing the resin composition by subjecting the filled mold to radiation from an actinic radiation source, wherein the filled mold is subjected to radiation in a multiple stage radiation cure comprising a plurality of radiation exposure steps of from about 10 seconds to about 20 minutes duration each with intervening cooling periods, and wherein the synthetic resin composition is a high refractive index core resin composition comprising:

(i) 2 to 70 parts by weight of at least one first compound corresponding to formula (I):

$$\text{(I)}$$

$$R_1 \diagup\!\!\!\diagdown\!\!\!\underset{O}{\overset{}{\text{C}}}\!\!-\!\!\left[\text{O}-\underset{R_2}{\overset{}{\text{CHCH}_2\text{O}}}\right]_n\!\!\!\underset{y_3}{\overset{y_4 \quad y_1}{\diagdown\!\!\!\diagup}}\!\!\underset{y_2}{\overset{}{\text{—X—}}}\!\!\underset{y_6}{\overset{y_5 \quad y_8}{\diagdown\!\!\!\diagup}}\!\!\underset{y_7}{\overset{}{\text{—}}}\left[\text{OCH}_2\underset{R_3}{\overset{}{\text{CH}-\text{O}}}\right]_{n'}\!\!\underset{O}{\overset{}{\text{C}}}\!\!\diagup\!\!\!\diagdown R_4$$

wherein n and n' independently are 0–30, $R_1$–$R_4$ independently represent H or $C_1$–$C_6$ alkyl, X is O, S, $SO_2$, $CO_2$, $CH_2$, CH=CH, $C(CH_3)_2$ or a single bond, and $y_1$–$y_8$ independently represent H, OH, halogen, mercaptan or $C_1$–$C_4$ alkyl, (ii) 2 to 80 parts by weight of at least one second compound corresponding to formula (II):

$$\text{(II)}$$

$$R_5 \diagup\!\!\!\diagdown\!\!\!\underset{O}{\overset{}{\text{C}}}\!\!-\!\!\left[\text{OCHCH}_2\!\!-\!\!\underset{R_6}{\overset{}{}}\right]_m\!\!-\!\!\text{O}\!\!-\!\!\underset{O}{\overset{}{\text{C}}}\!\!\diagup\!\!\!\diagdown R_7$$

wherein m is at least 1, and $R_5$–$R_7$ independently represent H or $C_1$–$C_6$ alkyl;

(iii) 2 to 60 parts by weight of a reactive diluent selected from the group consisting of 1,6-hexanediol di(meth)acrylate, trimethylolpropane tri(meth)acrylate, isobornyl (meth)acrylate, 2-hydroxyethyl (meth)acrylate, 2-phenoxyethyl (meth)acrylate, vinyl benzoate, vinyl 4-t-butyl benzoate, styrene, divinyl benzene, and mixtures thereof; and (iv) 2 to 60 parts by weight of a multi-functional (meth)acrylate or (meth)acrylate derivative with three or more acrylate functional groups selected from the group consisting of trimethylolpropane tri(meth)acrylate, pentaerythritol tri(meth)acrylate, glyceryl tri(meth)acrylate pentaerythritol tetra(meth)acrylate, di-trimethylolpropane tetra(meth)acrylate, dipentaerythritol penta(meth)acrylate, penta(meth)acrylate ester and mixtures thereof;

per 100 total parts by weight of components (I), (ii), (iii) and (iv), the composition further comprising (v) 0.0001 to 1.0 part by weight of at least one photochromic dye;

(vii) 0.01 to 3 part by weight of a photo initiator; and (vii) 0.01 to 3 part by weight of a thermal initiator.

31. A process according claim 30, wherein the intervening cooling is effected by exposing the filled mold at the end of each radiation exposure step to a cooling medium selected from the group consisting of ambient air, chilled air, ambient water and chilled water.

32. A process according to claim 30, wherein the synthetic resin composition is subjected to radiation from the actinic radiation source until the composition approaches its thermal polymerization reaction initiation temperature.

* * * * *